(12) United States Patent
Stoller et al.

(10) Patent No.: US 11,797,376 B2
(45) Date of Patent: *Oct. 24, 2023

(54) ADAPTIVE BACKGROUND SCANS IN A MEMORY SUB-SYSTEM

(71) Applicant: Micron Technology, Inc., Boise, ID (US)

(72) Inventors: Scott Anthony Stoller, Boise, ID (US); Pitamber Shukla, Boise, ID (US); Anita Marguerite Ekren, Loveland, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,309

(22) Filed: Dec. 13, 2022

(65) Prior Publication Data

US 2023/0113480 A1    Apr. 13, 2023

Related U.S. Application Data

(63) Continuation of application No. 17/205,545, filed on Mar. 18, 2021, now Pat. No. 11,556,410.

(51) Int. Cl.
*G06F 11/07* (2006.01)
*G06F 11/30* (2006.01)

(52) U.S. Cl.
CPC ........ *G06F 11/0793* (2013.01); *G06F 11/076* (2013.01); *G06F 11/0772* (2013.01); *G06F 11/0787* (2013.01); *G06F 11/3037* (2013.01)

(58) Field of Classification Search
CPC ............... G06F 11/0793; G06F 11/076; G06F 11/0772; G06F 11/0787; G06F 11/3037; G06F 11/0727; G06F 11/0766
See application file for complete search history.

(56) References Cited

U.S. PATENT DOCUMENTS

| | | |
|---|---|---|
| 6,412,089 B1 | 6/2002 | Lenny et al. |
| 6,493,656 B1 | 12/2002 | Houston et al. |
| 9,529,674 B2 | 12/2016 | Pereira et al. |
| 11,556,410 B2 * | 1/2023 | Stoller ............... G06F 11/0787 |
| 2005/0246612 A1 | 11/2005 | Leis et al. |
| 2009/0241011 A1 | 9/2009 | Yamamoto |
| 2010/0153680 A1 | 6/2010 | Baum et al. |
| 2014/0317460 A1 | 10/2014 | Kleveland et al. |
| 2020/0019458 A1* | 1/2020 | Cadloni ................ G11C 29/44 |
| 2021/0181993 A1* | 6/2021 | Cadloni ............... G06F 3/0659 |
| 2022/0066679 A1* | 3/2022 | Hieb ..................... G06F 11/076 |
| 2022/0300366 A1 | 9/2022 | Stoller et al. |

\* cited by examiner

*Primary Examiner* — Cynthia Britt
(74) *Attorney, Agent, or Firm* — Schwegman Lundberg & Woessner, P.A.

(57) ABSTRACT

A log of error events associated with a memory device is maintained. Each error event included in the log is associated with one of multiple physical locations within the memory device. A physical location within the memory device is identified for background scanning based on the log of error events. A background scan is performed on the physical location identified based on the log of error events.

20 Claims, 5 Drawing Sheets

ADAPTIVE BACKGROUND SCANS IN A MEMORY SUB-SYSTEM

PRIORITY APPLICATION

This application is a continuation of U.S. application Ser. No. 17/205,545, filed Mar. 18, 2021, which is incorporated herein by reference in its entirety.

TECHNICAL FIELD

Embodiments of the disclosure relate generally to memory sub-systems and, more specifically, to adaptive background scans in a memory sub-system.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to performing adaptive background scanning in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

Some memory devices (e.g., NAND memory devices) include an array of memory cells (e.g., flash cells) to store data. Each cell includes a transistor and within each cell, data is stored as the threshold voltage of the transistor, based on the logical value of the cell (e.g., 0 or 1). During a read operation, a read reference voltage is applied to the transistor, and if the read reference voltage is higher than the threshold voltage of the cell, the transistor is programmed and is recognized by a memory sub-system as a binary value of 0. Memory cells in these devices can be grouped as pages that can refer to a logical unit of the memory device used to store data. With some types of memory devices (e.g., NAND), pages are grouped to form blocks (also referred to herein as "memory blocks").

A background scan operation can run in the background of a memory sub-system (e.g., during idle periods in which the memory sub-system is not performing other operations in response to a host-initiated command). Memory device background scanning can begin by reading a section of a memory device, such as a codeword, a block, or a portion of a block. The background scan can track the number of bit corrections needed in order to determine the quality of that section of memory. The background scan can also determine whether sections are not correctable. The section of memory can be analyzed to determine a metric (e.g., in terms of amount or type of error correction required, estimated remaining life, number of cells functioning below a threshold level, the section not being correctable). If the metric is above a threshold, the background scan can proceed to a next memory section. If the metric is below the threshold, the background scan can attempt corrective measures, such as by performing a refresh relocation event on the memory section or a memory portion related to the memory section. For example, if a portion of a block is read and determined to have a metric below the threshold, a refresh relocation event can be performed for the block containing the read portion after data has been recovered using system driven read recovery methods.

Conventionally, background scans occur at a particular frequency over the life of the memory device. In some conventional implementations, a memory sub-system controller operates a timer and when the timer reaches a timing threshold (e.g. 3 minutes), a background scan is initiated. A traditional approach to background scanning is to be as aggressive as possible to try and catch as much as possible. However, this traditional approach fails to account for the variability in quality and weak spots of certain devices such as NAND. For example, a given memory device may have significant variability in the physical locations at which error events occur. Meaning, background scans may repeatedly target certain locations where error events are unlikely to occur while ignoring other areas in which error events are highly likely to occur. Hence, the traditional approach results in insufficient background scanning that often reduces relative performance and reliability of the memory device.

Aspects of the present disclosure address issues with traditional background scanning techniques by utilizing an adaptive background scanning methodology. The adaptive background scanning methodology leverages error data from background scans and other data integrity checks to identify physical locations in the memory devices that are leading to high occurrences of error events such as read errors, error handling events, or block folding events. A component of a memory sub-system controller (e.g., firmware) aggregates and uses the error data to increase a rate of background scans on high-risk locations within the memory device.

The adaptive background scanning methodology described herein improves the overall reliability of the memory sub-system by adapting to and compensating for variability in memory devices and workloads. For example, the background scanning component more frequently targets the worst-case sections of the memory device by scanning those locations more often. The adaptive background scanning methodology also provides an adaptable solution to NAND excursions (e.g., material variability or manufacturing line shift). Further, the adaptive background scanning methodology also allows high value systems to utilize low quality NAND devices. In addition, the adaptive background scanning methodology can improve overall efficiencies of background scans by focusing on the worst sections of the memory device, thereby improving device reliability without sacrificing performance with additional scans. In this way, the overall rate of background scans can be reduced while still ensuring the same level of reliability.

Figure 1:
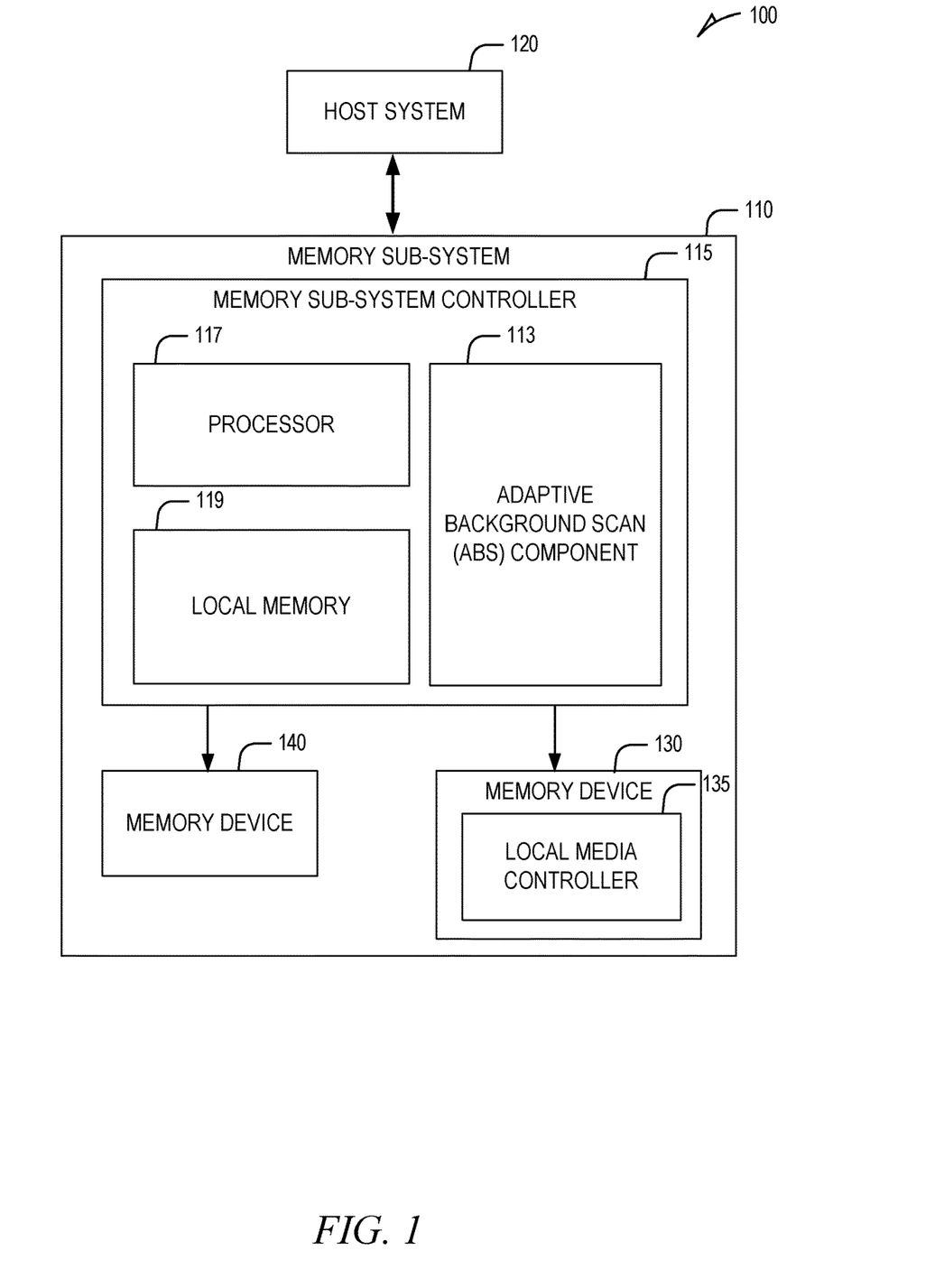
FIG. 1 illustrates an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operates in conjunction with memory sub-system controller 115 to execute operations on one or more memory cells of the memory devices 130.

The memory sub-system 110 also includes an adaptive background scan (ABS) component 113 that is responsible for managing and performing background scans on the memory devices 130 and 140. During a background scan, the ABS component 113 reads data from a portion of one of the memory devices 130 or 140 (e.g., a page, a block, or a portion of a block) to determine a metric (e.g. in terms of amount or type of error correction required, estimated remaining life, amount of cells functioning below a threshold level, the section not being correctable by the ECC engine) and if the metric is below a threshold, corrective actions are performed by the memory sub-system controller 115, such as by performing a refresh relocation event on the portion of the memory device from which the data was read. To improve the efficiency of background scans, the ABS component 113 maintains one or more logs of error events occurring at the memory devices 130 and 140 and uses the one or more logs to identify physical locations within the devices 130 and 140 for background scanning. As an example, the ABS component 113 can maintain a first log that identifies error events by NAND chip and a second log that identifies error events by word line.

In some embodiments, the memory sub-system controller 115 includes at least a portion of the ABS component 113. For example, the memory sub-system controller 115 can include a processor 117 (processing device) configured to execute instructions stored in local memory 119 for performing the operations described herein. In some embodiments, the ABS component 113 is part of the host system 120, an application, or an operating system. In some embodiments, the local media controller 135 includes at least a portion of the ABS component 113.

Figure 2:
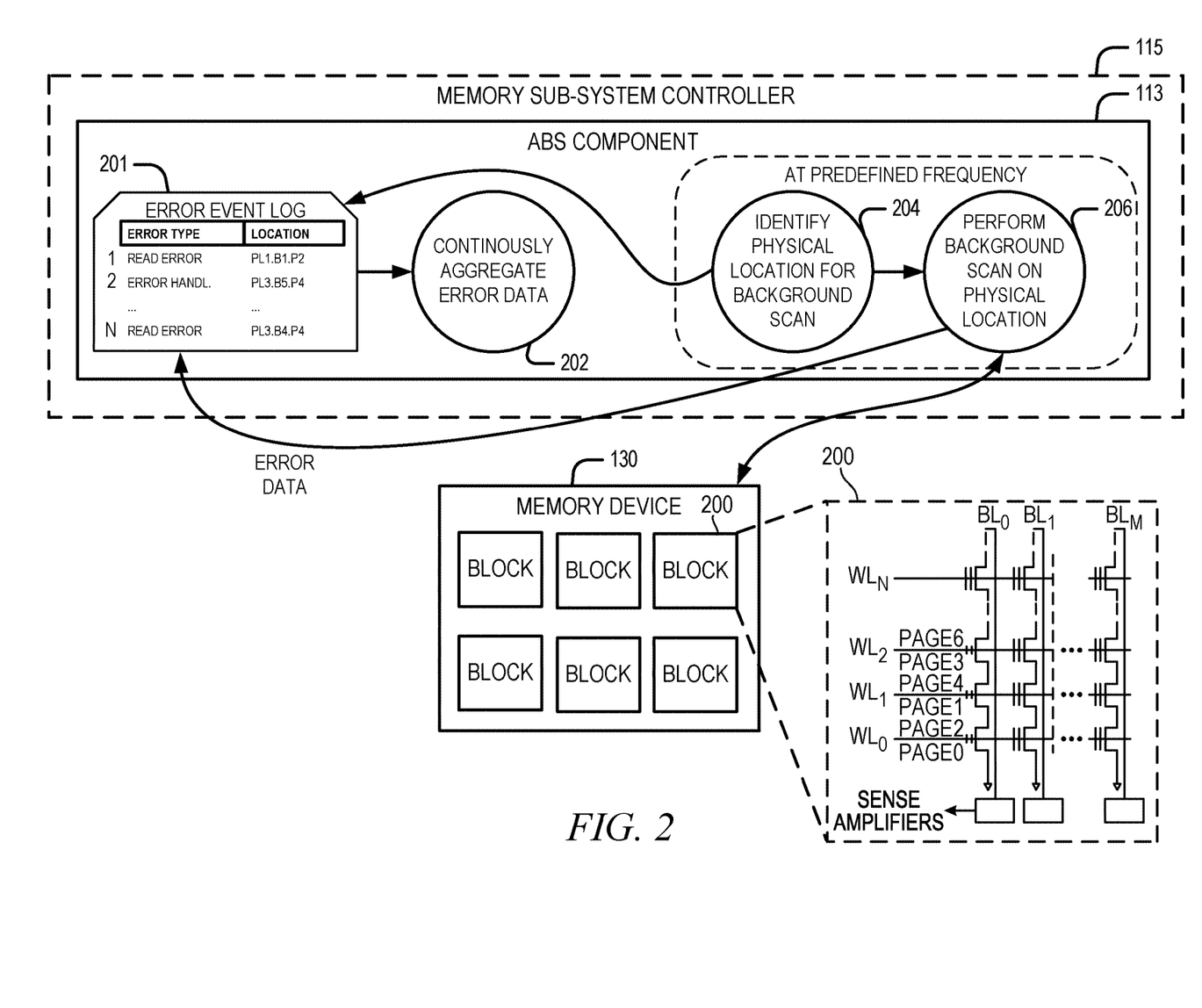
FIG. 2 is a data flow diagram illustrating interactions between components of the memory sub-system in performing adaptive background scanning, in accordance with some embodiments of the present disclosure.

FIG. 2 is a data flow diagram illustrating interactions between components of the memory sub-system in performing adaptive background scanning, in accordance with some embodiments of the present disclosure. In the example illustrated in FIG. 2, the memory device 130 is a NAND memory device including multiple memory blocks.

As shown, a NAND block 200 includes an array (2D or 3D) of pages (rows) and strings (columns). Each NAND cell includes a transistor, and within each cell, data is stored as the threshold voltage of the transistor. SLC NAND, for example, can store one bit per cell. Other types of memory cells, such as MLCs, TLCs, QLCs, and PLCs can store multiple bits per cell. Strings are connected within the NAND block 200 to allow storage and retrieval of data from selected cells. NAND cells in the same column are connected in series to form a bit line (BL). All cells in a bit line are connected to a common ground on one end and a common sense amplifier on the other for reading the threshold voltage of one of the cells when decoding data. NAND cells are connected horizontally at their control gates to a word line (WL) to form a page. In MLC, TLC, QLC, and PLC NAND, a page is a set of connected cells that share the same word line and is the minimum unit to program.

The ABS component 113 builds and maintains an error event log 201 based on error data generated by the memory sub-system controller 115 and the memory device 130. The error event log includes error events detected at the memory device 130. For example, error events can be detected in performing background scans. These error events include, for example, read errors, error handling events, and block refresh events described in error data generated by the memory sub-system controller 115. Each error event included in the error event log 201 is associated with a physical location (e.g., a page, block, or portion thereof) in the memory device 130. More specifically, each entry in the error event log 201 indicates an error event type (e.g., read error, error handling event, and block refresh event) along with an identifier that corresponds to a physical location in the memory device 130 at which the event occurred.

In some embodiments, the error event log 201 is limited to a predetermined number of most recent error events. Thus, once the number of error events in the error event log 201 reaches the predetermined number, the ABS component 113 removes the oldest error event from the log before adding a newly detected error event. In some embodiments, multiple instances of a single error event can be added to the error event log 201. By adding multiple instances of a single error event, the ABS component 113 can increase the probability that a physical location corresponding to the error event will be selected for a background scan.

At 202, the ABS component 113 continuously monitors and aggregates the error data corresponding to the error event log 201, and at a predefined frequency, the ABS component 113 uses the error event log 201 to identify a physical location in the memory device 130 (at 204) and the ABS component 113 performs a background scan on the identified physical location (at 206). For example, the ABS component 113 may select an error event from the error event log 201 at random and perform a background scan on the corresponding physical location. The ABS component 113 utilizes a timer (e.g., operated by the memory sub-system controller 115) and when the time reaches a timing threshold, the ABS component 113 identifies the physical location and performs the background scan on the physical location. In this manner, the ABS component 113 performs background scans at a predefined frequency. The ABS component 113 can adjust the frequency of background scans based on a rate of error events (e.g., errors per power-on-hours, errors per bytes written, or errors per program-erase cycle). Accordingly, the ABS component 113 can include a counter to track the total number of error events added to the error event log 201.

In performing a background scan on a physical location, the ABS component 113 analyzes data read from the physical location to determine a metric (e.g., an amount or number of bit errors, an amount or type of error correction required, estimated remaining life, amount of cells functioning below a threshold level, the section not being correctable by the ECC engine) and if the metric is below a threshold, the corrective actions are performed by the memory sub-system controller 115, such as by performing a refresh relocation event on physical location. For example, if a page in the memory device 130 is read and determined to have a metric below the threshold, a refresh relocation event can be performed for the page. During a refresh relocation event, data from the scanned page is copied over to a new physical location within the memory device (e.g., an open page in an open block 200 of the memory device 130). If an error event is detected during the background scan (e.g., if the error metric exceeds the threshold), the ABS component 113 can add the newly detected error event to the error event log 201 to support continued ABS management within the memory sub-system 110.

Figure 3:
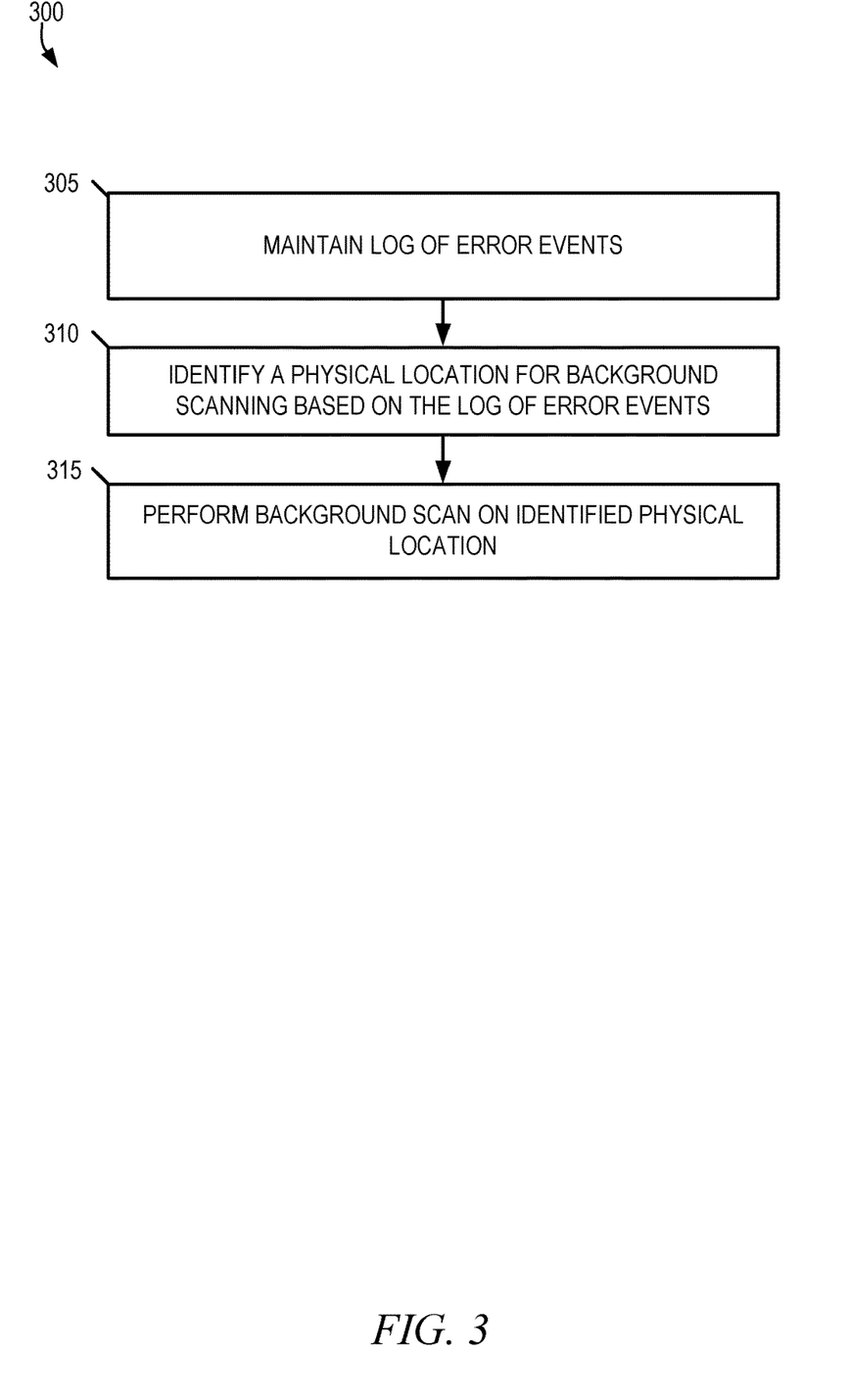
FIGS. 3 and 4 are flow diagrams illustrating an example method for performing adaptive background scanning in a memory sub-system, in accordance with some embodiments of the present disclosure.
Figure 4:
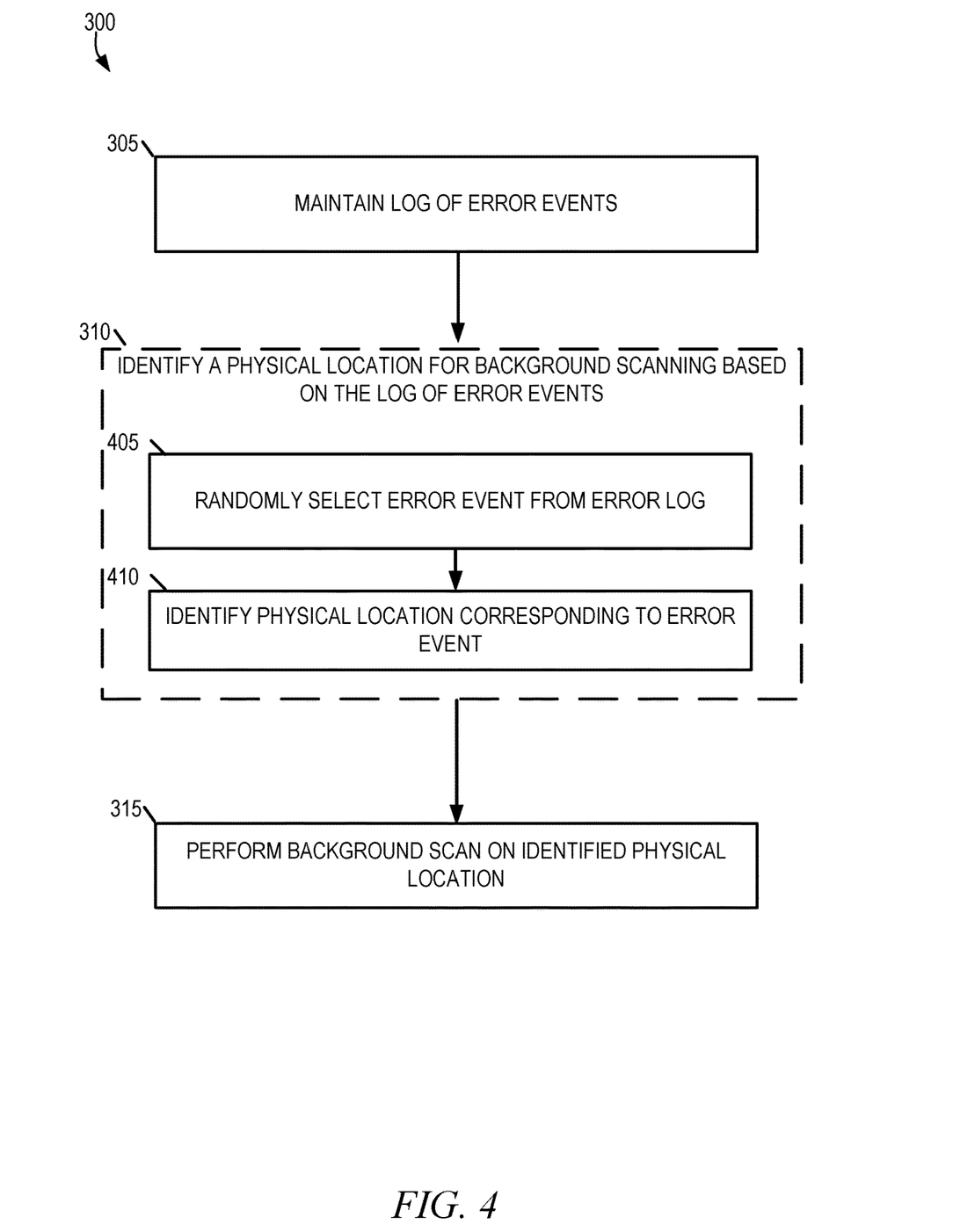

FIGS. 3 and 4 are flow diagrams illustrating an example method 300 for adaptive background scanning in a memory sub-system (e.g., the memory sub-system 110) in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the ABS component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device maintains a log of error events (e.g., error event log 201) occurring at one or more memory devices (e.g., the memory devices 130 and/or 140). Each error event in the error log is associated with a physical location on a memory device. More specifically, each entry in the log of error events includes an indicator of error event type and an identifier that corresponds to a physical location in a memory device at which the error event occurred. Multiple instances of a given error event can be included in the log to increase the probability of that location being selected for a background scan.

To maintain the log of error events, the processing device aggregates error data generated at the one or more memory devices and/or a memory sub-system controller coupled to the one or more memory devices. The error data aggregated by the processing device describes read errors, error handling events, and block folding events detected at the memory device. Hence, the log of error events identifies read errors, error handling events, and block folding events detected at the one or more memory devices. Consistent with some embodiments, the processing device can maintain multiple logs of error events. For example, the processing device can maintain a first log that identifies error events by NAND chip or device and maintain a second log that identifies error events by word line.

In some embodiments, the log of error events is limited to a predetermined number of most recent error events. Thus, once the log of error events reaches the predetermined number, the processing device removes the oldest error event from the log before adding a newly detected error event.

At operation 310, the processing device identifies a physical location within a memory device for background scanning based on the log of error events. As shown in FIG. 4, the operation 310 can include operations 405 and 410, consistent with some embodiments. At operation 405, the processing device randomly selects an error event from the log of error events, and at operation 410, the processing device identifies the physical location corresponding to the randomly selected error event.

Returning to FIG. 3, in some embodiments, the processing device identifies the physical location for background scanning based on the number or frequency of error events occurring at the physical location. For example, to identify the physical location, the processing device can determine a number of error events in the log that are associated with each physical location included in the log. The processing device can select the physical location with the highest number of error events for background scanning.

In some embodiments, the processing device identifies the physical location for background scanning based on a predicted likelihood that a future error event will occur at the physical location. For example, the processing device can analyze the log of error events to predict a likelihood of a future error event occurring at each physical location included in the log and select the physical location that has the highest likelihood.

At operation 315, the processing device performs a background scan on the identified physical location. In performing the background scan, the processing device analyzes data read from the physical location to determine an error metric (e.g., an amount or type of error correction required, estimated remaining life, amount of cells functioning below a threshold level, the physical location not being correctable by the ECC engine, etc.) and if the error metric is below a threshold, the corrective actions are performed by the memory sub-system controller 115, such as by performing a refresh relocation event on a physical location. For example, if a page in the memory device 130 is read and determined to have a metric below the threshold, a refresh relocation event can be performed for the page. During a refresh relocation event, data from the scanned page is copied over to a new physical location within the memory device (e.g., an open page in an open block 200 of the memory device 130). If an error event is detected during the background scan (e.g., if the error metric exceeds the threshold), the processing device can add the newly detected error event to the log to support continued ABS management within the memory sub-system.

Consistent with some embodiments, the operation 305 is ongoing, and the operations 310 and 315 can be repeated at a predetermined frequency. That is, the processing device continues to update the log of error events as new error events are detected and new physical locations are identified and scanned at a predefined frequency. For example, after scanning a first physical location identified based on the log of error events, the processing device waits a predefined interval (based on the predetermined frequency) before identifying and scanning a second physical location in the memory device based on the log. Consistent with some embodiments, the processing device can change the frequency with which physical locations are selected (operation 310) and scanned (operation 315). For example, the processing device can change the frequency based on a rate of error events (e.g., errors per power-on-hours, errors per bytes written, or errors per program-erase cycle).

Consistent with some embodiments, the method 300 can be performed and repeated at predefined frequency in conjunction with a traditional background scan in which a portion of the memory device is scanned at random. For example, at each interval, at least the operations 310 and 315 are performed in conjunction with (e.g., prior to or after) the traditional background scan.

EXAMPLES

Example 1 is a memory sub-system comprising: a memory device; and a processing device, operatively coupled with the memory device, to perform operations comprising: maintaining a log of error events associated with the memory device, each error event included in the log being associated with one of multiple physical locations within the memory device; identifying a physical location within the memory device for background scanning based on the log of error events; and performing a background scan on the physical location identified from the physical location.

Example 2 includes the memory sub-system of claim 1, wherein identifying the physical location within the memory device comprises: randomly selecting an error event from the log of error events; and determining the physical location is associated with the error event.

Example 3 includes the memory sub-system of any one of claims 1 and 2, wherein identifying the physical location within the memory device comprises: determining a number of error events in the log that are associated with the physical location; and selecting the physical location based on the number of error events in the log that are associated with the physical location.

Example 4 includes the memory sub-system of any one of claims 1-3, wherein identifying the physical location within the memory device comprises: predicting a likelihood of a future error event occurring at the physical location of the memory device; and selecting the physical location based on the likelihood of the future error event occurring at the physical location.

Example 5 includes the memory sub-system of any one of claims 1-4, wherein maintaining the log of error events comprises aggregating data describing read errors, error handling events, and block folding events detected at the memory device.

Example 6 includes the memory sub-system of any one of claims 1-5, wherein the log of error events is limited to a predetermined number of most recent error events.

Example 7 includes the memory sub-system of any one of claims 1-6, wherein: the physical location is a first physical location; the background scan is a first background scan; and the operations further comprise: after a predetermined interval, identifying a second physical location within the memory device for background scanning; and performing a background scan on the second physical location.

Example 8 is a method comprising: maintaining a log of error events associated with a memory device, each error event included in the log being associated with one of multiple physical locations within the memory device; identifying a physical location within the memory device for background scanning based on the log of error events; and performing a background scan on the identified physical location.

Example 9 includes the method of example 8, wherein identifying the physical location within the memory device comprises: randomly selecting an error event from the log of error events; and determining the physical location is associated with the error event.

Example 10 includes the method of any one of examples 8 and 9, wherein identifying the physical location within the memory device comprises: determining a number of error events in the log that are associated with the physical location; and selecting the physical location based on the number of error events in the log that are associated with the physical location.

Example 11 includes the method of any one of examples 8-10, wherein identifying the physical location within the memory device comprises: predicting a likelihood of a future error event occurring at the physical location of the memory device; and selecting the physical location based on the likelihood of the future error event occurring at the physical location Example 12 includes the method of any one of examples 8-11, wherein maintaining the log of error events comprises aggregating data describing read errors, error handling events, and block folding events detected at the memory device.

Example 13 includes the method of any one of examples 8-12, wherein the log of error events is limited to a predetermined number of most recent error events.

Example 14 includes the method of any one of examples 8-13, wherein: the physical location is a first physical location; the background scan is a first background scan; and the method further comprises: after a predetermined interval, identifying a second physical location within the memory device for background scanning; and performing a background scan on the second physical location.

Example 15 is a computer-readable storage medium comprising instructions that, when executed by a processing device, configure the processing device to perform operations comprising: maintaining a log of error events associated with a memory device, each error event included in the log being associated with one of multiple physical locations within the memory device; identifying a physical location within the memory device for background scanning based on the log of error events; and performing a background scan on the identified physical location.

Example 16 includes the computer-readable storage medium of example 15, wherein identifying the physical location within the memory device comprises: randomly selecting an error event from the log of error events; and determining the physical location is associated with the error event.

Example 17 includes the computer-readable storage medium of any one or more of examples 15 and 16, wherein identifying the physical location within the memory device comprises: determining a number of error events in the log that are associated with the physical location; and selecting the physical location based on the number of error events in the log that are associated with the physical location.

Example 18 includes the computer-readable storage medium of any one or more of examples 11-17, wherein maintaining the log of error events comprises aggregating data describing read errors, error handling events, and block folding events detected at the memory device.

Example 19 includes the computer-readable storage medium of any one or more of examples 11-18, wherein the log of error events is limited to a predetermined number of most recent error events.

Example 20 includes the computer-readable storage medium of any one or more of examples 11-19, wherein: the physical location is a first physical location; the background scan is a first background scan; and the operations further comprise: after a predetermined interval, identifying a second physical location within the memory device for background scanning; and performing a background scan on the second physical location.

Figure 5:
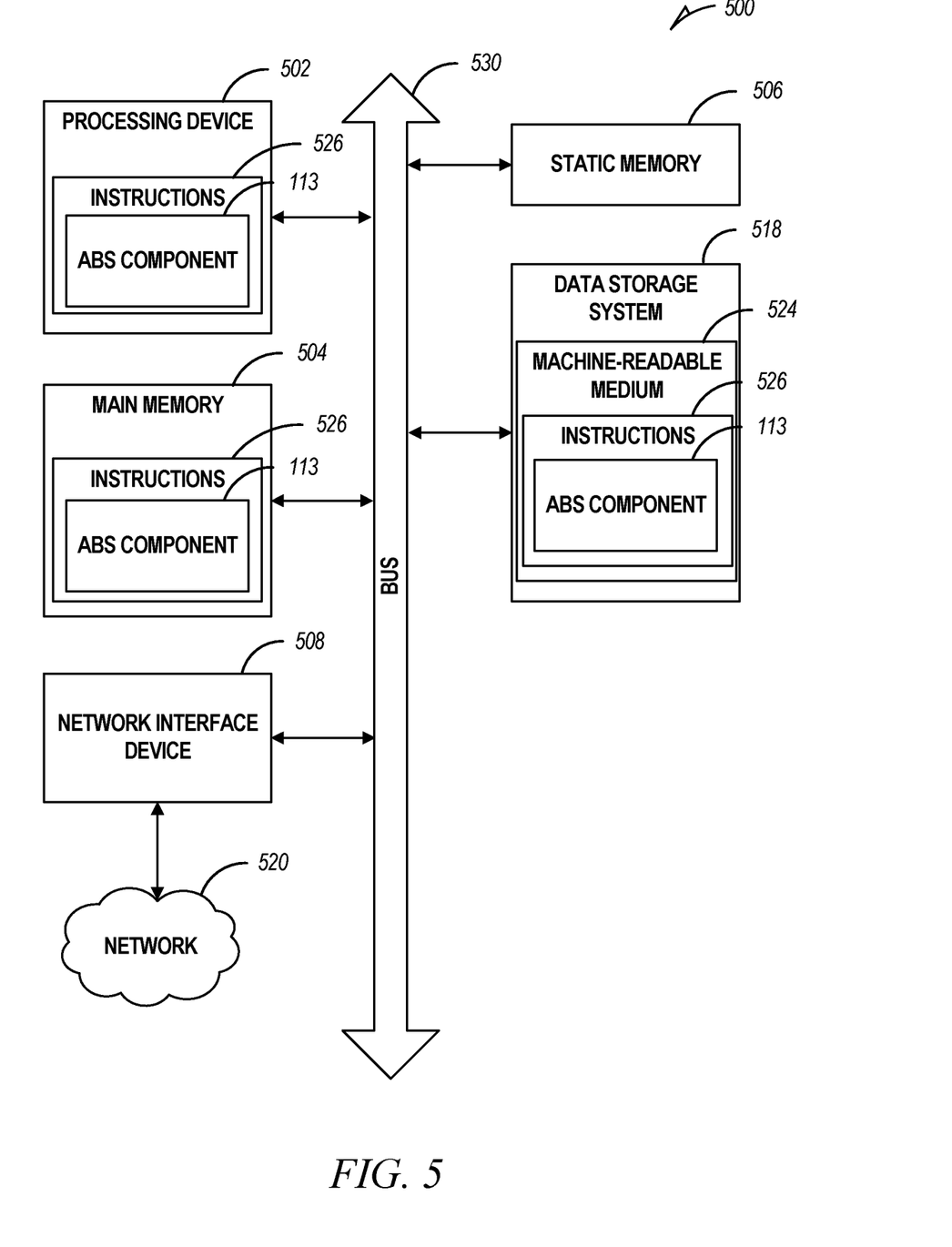
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the ABS component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an ASIC, a FPGA, a digital signal processor (DSP), network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data destruction component (e.g., the ABS component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
maintaining a log of error events associated with the memory device, each error event included in the log being associated with one of multiple physical locations within the memory device;
identifying a physical location from among the multiple physical locations within the memory device that is associated with a highest number of error events in the log of error events; and
performing a background scan on the physical location based on the physical location being associated with the highest number of error events in the log of error events.

2. The system of claim 1, wherein:
the physical location is a first physical location;
the background scan is a first background scan;
the operations further comprise:
identifying a second physical location within the memory device for background scanning based on the log of error events; and
performing a second background scan on the second physical location.

3. The system of claim 2, wherein identifying the second physical location within the memory device comprises:
randomly selecting an error event from the log of error events; and
determining the second physical location is associated with the error event.

4. The system of claim 2, wherein identifying the second physical location within the memory device comprises:
predicting a likelihood of a future error event occurring at the second physical location of the memory device; and
selecting the second physical location based on the likelihood of the future error event occurring at the second physical location.

5. The system of claim 2, wherein:
the identifying of the second physical location within the memory device is performed after a predetermined interval.

6. The system of claim 1, wherein maintaining the log of error events comprises aggregating data describing read errors, error handling events, and block folding events detected at the memory device.

7. The system of claim 1, wherein the log of error events is limited to a predetermined number of most recent error events.

8. A method comprising:
maintaining a log of error events associated with a memory device, each error event included in the log being associated with one of multiple physical locations within the memory device;
identifying a physical location from among the multiple physical locations within the memory device that is associated with a highest number of error events in the log of error events; and
performing a background scan on the physical location based on the physical location being associated with the highest number of error events in the log of error events.

9. The method of claim 8, wherein:
the physical location is a first physical location;
the background scan is a first background scan;
the method further comprises:
identifying a second physical location within the memory device for background scanning based on the log of error events; and
performing a second background scan on the second physical location.

10. The method of claim 9, wherein identifying the second physical location within the memory device comprises:
randomly selecting an error event from the log of error events; and
determining the second physical location is associated with the error event.

11. The method of claim 9, wherein identifying the second physical location within the memory device comprises:
predicting a likelihood of a future error event occurring at the second physical location of the memory device; and
selecting the second physical location based on the likelihood of the future error event occurring at the second physical location.

12. The method of claim 9, wherein:
the identifying of the second physical location within the memory device is performed after a predetermined interval.

13. The method of claim 8, wherein maintaining the log of error events comprises aggregating data describing read errors, error handling events, and block folding events detected at the memory device.

14. The method of claim 8, wherein the log of error events is limited to a predetermined number of most recent error events.

15. A non-transitory computer-readable storage medium comprising instructions that, when executed by a processing device, configure the processing device to perform operations comprising:
maintaining a log of error events associated with a memory device, each error event included in the log being associated with one of multiple physical locations within the memory device;
identifying a physical location from among the multiple physical locations within the memory device that is associated with a highest number of error events in the log of error events; and
performing a background scan on the physical location based on the physical location being associated with the highest number of error events in the log of error events.

16. The non-transitory computer-readable storage medium of claim 15, wherein:
the physical location is a first physical location;
the background scan is a first background scan;
the operations further comprise:
identifying a second physical location within the memory device for background scanning based on the log of error events; and
performing a second background scan on the second physical location.

17. The non-transitory computer-readable storage medium of claim 16, wherein identifying the second physical location within the memory device comprises:
randomly selecting an error event from the log of error events; and
determining the second physical location is associated with the error event.

18. The non-transitory computer-readable storage medium of claim 16, wherein:
the identifying of the second physical location within the memory device is performed after a predetermined interval.

19. The non-transitory computer-readable storage medium of claim 15, wherein maintaining the log of error events comprises aggregating data describing read errors, error handling events, and block folding events detected at the memory device.

20. The non-transitory computer-readable storage medium of claim 15, wherein the log of error events is limited to a predetermined number of most recent error events.

* * * * *